3,159,439
RETRACTABLE MEDICINE CABINET MIRROR
George C. Miller, 161 N. Ocean Ave., Freeport, N.Y.
Filed Feb. 23, 1962, Ser. No. 175,062
3 Claims. (Cl. 312—227)

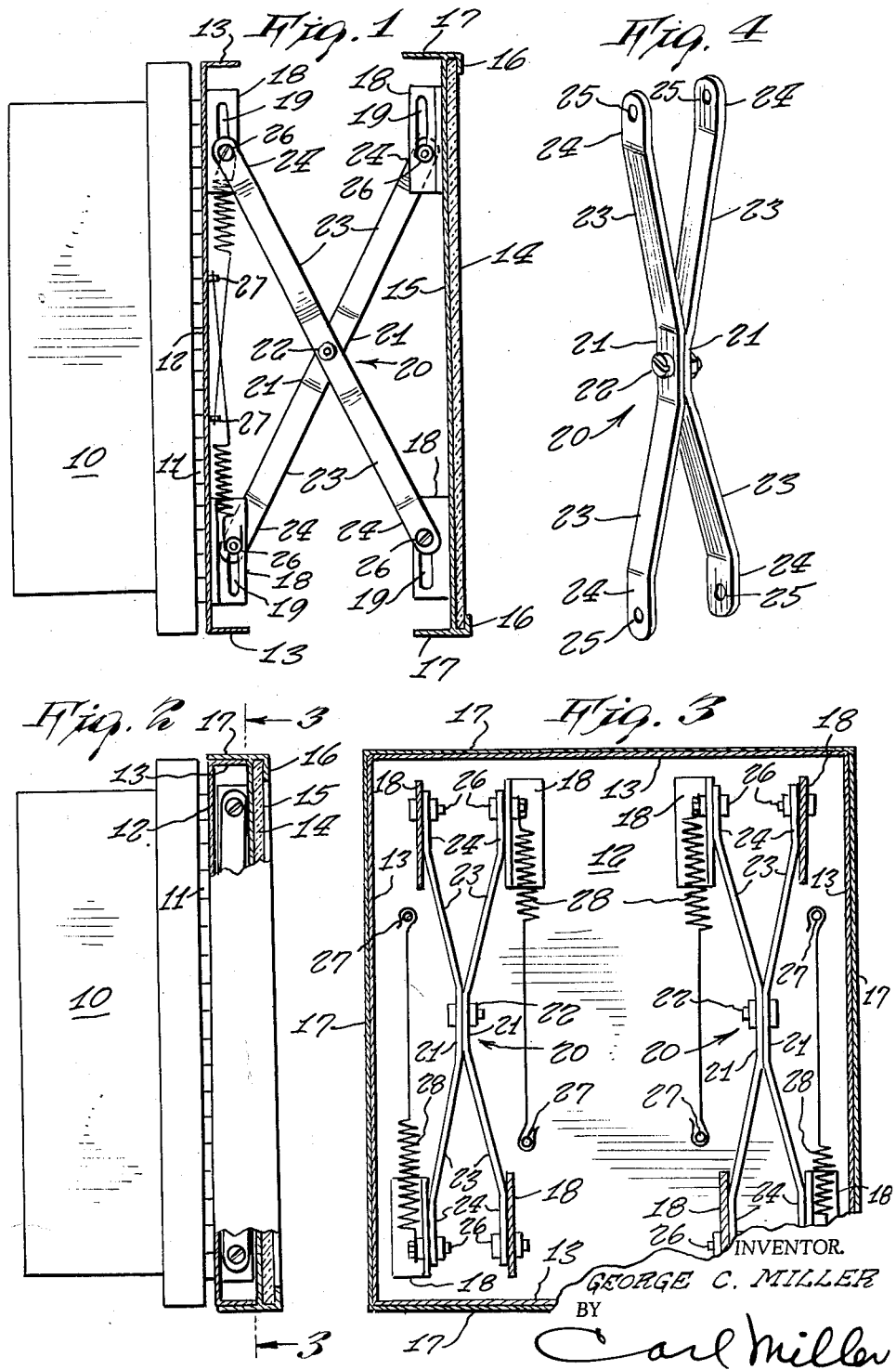

This invention relates to bathroom fixtures and particularly to mirrors disposed on doors of medicine cabinets.

It is often desirable to be close to a mirror being used and particularly with a bathroom mirror when a man is shaving or when a woman is applying makeup. Normally, medicine cabinets are mounted in bathroom walls over sinks which make it difficult and awkward for close-up use. To obviate such difficulties, it is desirable to provide a mirror which may be displaced from its normal position to facilitate its use.

Accordingly, one object of this invention is to provide a mirror for bathroom medicine cabinets that is supported on the cabinet door and may be displaced therefrom to facilitate its use.

Another object of this invention is to provide a mirror forming a portion of a medicine cabinet door which may be displaced outwardly therefrom to facilitate its use and being so constructed to remain in its normal and extended positions.

Another object of this invention is to provide a mirror of the above type having simple and rugged construction being rigidly supported when extended from the cabinet door.

Another object of this invention is to provide a mirror for medicine cabinets in the aforementioned type which may replace mirrors of existing medicine cabinets.

These and other objects and advantages will become apparent to those skilled in the art by referring to the following description and the accompanying drawings, wherein:

FIGURE 1 is an elevational view of a medicine cabinet with its door and mirror in accordance with the invention in section, the mirror being in its extended position.

FIGURE 2 is an elevational view of the cabinet with a portion of the door and the mirror that is in the retracted position cut away.

FIGURE 3 is an elevational section taken on line 3—3 of FIGURE 2.

FIGURE 4 is a perspective view of the linkage mounting the mirror to the medicine cabinet door.

Referring now to the drawings, a medicine cabinet 10 to be mounted in a wall has a piano type hinge 11 along one side thereof for hanging a door 12. The door 12 has a peripheral flange 13 extending forwardly so the door 12 is dish-shaped.

The mirror 14 is mounted in a frame having a backing plate 15 with a forwardly extending flange 16 which extends over the edges of the mirror 14. The plate 15 has a backwardly extending flange 17 which is adjacent to and outwardly of flange 13 of the door 12 when the mirror 14 is in the retracted position.

Fixed to the door 12 and the plate 15 are four sets of diagonally offset pairs of brackets 18. When the mirror 14 is retracted, there are two pairs of brackets 18 at the top and two pairs of brackets 18 at the bottom of the door 12 plate 15 arrangement, in the form of rectangles as clearly shown in FIGURE 3. Each of the brackets 18 has a slot 19.

Connected to the two sets of rectangularly disposed brackets 18 are two toggle linkage sets 20. As shown in FIGURE 4, each linkage set 20 has a pair of bars 21 pivotally interconnected at their centers by a bolt 22 providing two pairs of diverging arms 23 terminating in parallel ends 24. The arm ends 24 are disposed between and connected to the pairs of spaced brackets 18 by bolts 26 which extend through the holes 25 in the bars 21 and the slots 19 of the brackets 18. Thus, each bar 21 is connected at one end 24 to a bracket 18 on the door 12 and at its other end 24 to a bracket 18 on the plate 15.

The door 12, as shown in FIGS. 1 and 3, has four anchor pins 27 vertically spaced from brackets 18 to receive ends of springs 28 each connected to one of the bars 21 by a bolt 26. The scissor type linkage sets 20 are housed between the brackets 18 and the door 12 and plate 15 when the mirror 14 is in its normally housed and retracted position. In this position of the mirror 14, the bolts 26 are located in the outer ends of slots 19. As the mirror 14 is pulled outwardly from the cabinet 10 as in the FIGURE 1 of the drawings, the bolts 26 move to the inner ends of the slots 19. Springs 28 bias the toggle linkage 20 to this terminal position.

As clearly shown in FIG. 2, it will be seen that in the retracted position of the combined backing plate 15 and mirror 14, that the flanges 17 of the backing plate project exteriorly of the door flanges 13 in overlapping sliding relation thereto and that the outer edges of the door flanges 13 abut the inside surface of the backing plate 15, thus defining an enclosure containing the toggle linkages, springs and brackets. With the parts so enclosed in the retracted position, the toggle linkages will be closed with the pivotal connections 26, 22, on dead center, and the springs 28 will be tensioned and will be in dead center position.

It is further understood that my invention for retractable medicine cabinet mirror may be provided with suitable fluorescent lighting fixtures on either side of the mirror (not shown in the drawing), so as to afford proper illumination.

While this invention has been described with particular reference to the construction shown in the drawing, it is to be understood that such is not to be construed as imparting limitations upon the invention, which is best defined by the claims appended hereto.

Having thus described and illustrated my invention, what I claim as new and desire to secure by Letters Patent is:

1. A medicine cabinet comprising a door hinged at one vertical side to a corresponding side of said cabinet, said door having a vertical wall and an outwardly directed peripheral flange normal to said wall, a frame defining a vertical backing plate provided with a rearwardly extending peripheral flange and a forwardly extending flange means, a mirror secured to the forward face of said backing plate by said forwardly extending flange means, said backing plate being movable towards and away from said vertical wall and in the fully retracted position of said backing plate, the peripheral flanges thereof will project exteriorly of the vertical wall flanges in overlapping sliding relation thereto and the outer edges of said vertical wall flanges will abut said backing plate such as to define an enclosure, a pair of upper and lower brackets secured to said vertical wall, a pair of upper and lower brackets secured to said backing plate, said brackets arranged such that corresponding brackets of each said pair of upper and lower brackets will be in opposed horizontal relationship, a toggle linkage disposed adjacent each vertical side of said door within said enclosure, means pivotally and slidably connecting each said toggle linkage at its upper and lower ends respectively, to the corresponding brackets of each said pair of upper and lower brackets, a pair of tension coil springs for each toggle linkage, a pair of anchor means fixedly secured to said vertical wall for each pair of springs, one end of each spring of a pair being connected to an anchor means and the other end thereof secured respectively to an upper and lower pivotal and slidable connection of said toggle linkage, whereby in the retracted position of said backing plate, said toggle linkages will close and tension said springs, and each spring will have a dead center relationship with respect to its associated toggle linkage, wherein in said retracted position of said backing plate and mirror, said corresponding brackets of each pair of upper and lower brackets of said vertical wall and backing plate are horizontally juxtaposed and in pairs lie adjacent a corner of said enclosure, a vertical slot in each bracket, each toggle linkage defined by a pair of links pivoted together at their center and diverging laterally towards their outer ends, said pivotal and slidably connecting means for said toggle linkage comprising pin means pivotally and slidably connecting an end of each link to a bracket and extending through the slot therein.

2. The medicine cabinet of claim 1, wherein said horizontally juxtaposed corresponding brackets at one side of said enclosure, are disposed one pair above the other, in vertical parallel planes with one link of each toggle linkage pivotally and slidably connected at one end to a bracket on the vertical wall and at its lower end to a bracket on the backing plate and the other link reversely connected to the other of said brackets of said corresponding brackets.

3. The medicine cabinet of claim 1, wherein said other end of each tension coil spring is secured to a pin means that connects an end of a toggle link to a bracket secured to said vertical wall, whereby in the extended forward position of said backing plate and mirror the toggle linkages will be opened and the coil springs will act to retain the pin means noted in the opposed inner ends of the slots in said brackets.

References Cited in the file of this patent
UNITED STATES PATENTS

| | | |
|---|---|---|
| 1,222,986 | Pick | Apr. 17, 1917 |
| 2,239,487 | Fulton | Apr. 22, 1941 |
| 2,284,531 | Miller | May 26, 1942 |
| 2,394,176 | Hillebrand | Feb. 5, 1946 |
| 2,839,199 | Peszlen | June 17, 1958 |